United States Patent
Severson (10) Patent No.: US 11,410,109 B2
(45) Date of Patent: Aug. 9, 2022

(54) PORTABLE REAL-TIME EXPERIENCE COMMUNICATIONS DEVICE AND MONITORING SYSTEM

(71) Applicant: Precog, LLC, Davidsonville, MD (US)

(72) Inventor: Matthew R. Severson, Davidsonville, MD (US)

(73) Assignee: Precog, LLC, Davidsonville, MD (US)

( * ) Notice: Subject to any disclaimer, the term of this patent is extended or adjusted under 35 U.S.C. 154(b) by 98 days.

(21) Appl. No.: 16/671,433

(22) Filed: Nov. 1, 2019

(65) Prior Publication Data

US 2020/0143309 A1 May 7, 2020

Related U.S. Application Data

(60) Provisional application No. 62/754,133, filed on Nov. 1, 2018.

(51) Int. Cl.
*G06Q 10/00* (2012.01)
*G06Q 10/06* (2012.01)
(Continued)

(52) U.S. Cl.
CPC ....... *G06Q 10/06395* (2013.01); *G06F 3/015* (2013.01); *G06Q 10/06393* (2013.01);
(Continued)

(58) Field of Classification Search
None
See application file for complete search history.

(56) References Cited

U.S. PATENT DOCUMENTS 6,380,928 B1   4/2002  Todd
6,640,241 B1 * 10/2003  Ozzie ................. H04L 12/1813
                                                           709/204
(Continued)

FOREIGN PATENT DOCUMENTS

WO    WO-2014150073 A2 *  9/2014  ......... H04N 21/4828

OTHER PUBLICATIONS

Patricia M. West (Beyond the Like Button: The Impact of Mere Virtual Presence on Brand Evaluations and Purchase Intentions in Social Media Settings, 2012, American Marketing Association)). (Year: 2012).*

*Primary Examiner* — Hafiz A Kassim
(74) *Attorney, Agent, or Firm* — Duane Morris LLP (57) ABSTRACT

A system and computer-implemented method for real-time monitoring and responding to user experiences at a location. The method includes deploying a centralized communications and display node, and each of a plurality of portable communications devices with a respective subject, within the location, receiving, from one or more of the portable devices, and at the centralized node, transmitted data including a respective identifier of a respective actuator of each of the one or more portable devices and that was activated by the respective subject, a respective activation time indicator, and a respective identifier of each of the one or more portable devices. The method also includes generating respective machine-readable values indicative of a positive or negative experience type for each of the actuator-activating subjects using the received data, and a respective alert using the generated machine-readable values and if the indicated experience type for the respective subject is negative.

11 Claims, 3 Drawing Sheets

(51) Int. Cl.
*H04W 4/021* (2018.01)
*G06Q 30/02* (2012.01)
*G06F 3/01* (2006.01)

(52) U.S. Cl.
CPC ... *G06Q 10/06398* (2013.01); *G06Q 30/0205* (2013.01); *H04W 4/021* (2013.01)

(56) References Cited

U.S. PATENT DOCUMENTS

| | | | |
|---|---|---|---|
| 8,332,232 B2 | 12/2012 | Nickerson et al. | |
| 8,760,248 B2* | 6/2014 | Marie | G06F 3/016 335/230 |
| 10,325,102 B2 | 6/2019 | AthuluruTlrumala et al. | |
| 10,346,621 B2 | 7/2019 | AthuluruTlrumala et al. | |
| 2002/0097680 A1* | 7/2002 | Liu | H04L 69/167 370/238 |
| 2003/0078804 A1* | 4/2003 | Morrel-Samuels | G06Q 30/0203 705/7.42 |
| 2005/0262188 A1* | 11/2005 | Mamou | G06Q 10/10 709/203 |
| 2006/0242154 A1* | 10/2006 | Rawat | G06F 16/168 |
| 2007/0018952 A1* | 1/2007 | Arseneau | H04H 40/27 345/156 |
| 2008/0032703 A1* | 2/2008 | Krumm | H04W 4/029 455/456.1 |
| 2008/0215415 A1* | 9/2008 | Willms | G06Q 30/0264 705/14.43 |
| 2010/0131664 A1* | 5/2010 | Veres | H04W 92/20 709/228 |
| 2011/0066720 A1* | 3/2011 | Wang | H04L 43/0811 709/224 |
| 2011/0106721 A1* | 5/2011 | Nickerson | G06Q 30/02 705/347 |
| 2011/0184781 A1* | 7/2011 | Hussam | G06Q 30/0203 705/7.32 |
| 2011/0222413 A1* | 9/2011 | Shukla | H04L 43/0811 370/241.1 |
| 2013/0191250 A1* | 7/2013 | Bradley | G06Q 30/0623 705/26.61 |
| 2014/0038640 A1* | 2/2014 | Wesselius | H04W 4/029 455/456.1 |
| 2014/0100922 A1* | 4/2014 | Aycock | G06Q 10/0639 705/7.38 |
| 2014/0218324 A1* | 8/2014 | Tissot | B06B 1/045 345/173 |
| 2014/0222576 A1* | 8/2014 | Shaw | H04L 51/38 705/14.58 |
| 2014/0278783 A1* | 9/2014 | Du | G06Q 10/0633 705/7.32 |
| 2015/0241970 A1* | 8/2015 | Park | G06F 3/016 345/173 |
| 2015/0371215 A1* | 12/2015 | Zhou | G06Q 20/384 705/71 |
| 2016/0055491 A1* | 2/2016 | Bulut | G06Q 30/0245 705/7.29 |
| 2016/0335686 A1* | 11/2016 | AthuluruTlrumala | H04N 21/44222 |
| 2017/0075701 A1* | 3/2017 | Ricci | B60R 25/01 |
| 2017/0280351 A1* | 9/2017 | Skaaksrud | H04W 4/025 |
| 2017/0287316 A1 | 10/2017 | Wildman et al. | |
| 2017/0352068 A1* | 12/2017 | Dominguez | G01C 21/206 |
| 2017/0366983 A1* | 12/2017 | Gunasekara | H04L 43/0817 |
| 2018/0158085 A1* | 6/2018 | Wohlwend | H04W 4/12 |
| 2019/0014488 A1* | 1/2019 | Tan | G06N 3/084 |
| 2019/0187859 A1* | 6/2019 | Friedman | G06F 3/0393 |
| 2019/0319961 A1* | 10/2019 | Levy | H04L 63/102 |
| 2020/0005116 A1* | 1/2020 | Kuo | G06N 20/00 |

* cited by examiner

PORTABLE REAL-TIME EXPERIENCE COMMUNICATIONS DEVICE AND MONITORING SYSTEM

CROSS-REFERENCE TO RELATED APPLICATIONS

This application claims priority to U.S. Provisional Patent Application Ser. No. 62/754,133, filed on Nov. 1, 2018, the entirety of which is incorporated herein by reference.

FIELD

The present disclosure is generally directed to communicating user experiences. More specifically, the present application is directed to a portable real-time experience communications device and closed monitoring system.

DESCRIPTION OF THE RELATED ART

Mobile devices such as cellular phones, Personal Digital Assistants (PDAs), smart phones, tablet computers, other wirelessly enabled devices, other portable handheld devices, hands-free/heads-up devices, wearables, such as, for example, Fitbit® wearables, Jawbone® fitness trackers, and the Apple® Watch, have successfully penetrated and been adopted, by the general consumer market and by many government entities. Functionalities on mobile devices are generally performed by software applications either in the form of software components that are built-in to the device's mobile operating system or separate mobile applications (also known as "mobile apps" or "apps") that run on the device's operating system. Recently, the development and use of mobile apps has become prevalent and now exist across a wide array of mobile device platforms. Individuals, businesses, and government agencies have come to enjoy, appreciate and rely on the convenience, flexibility and mobility of mobile devices as a means to readily obtain access to information, facilitate communications and interact with friends, family, colleagues and business entities, other friendly deployed units, etc. Persons are exceedingly more comfortable using mobile devices to communicate their thoughts, opinions, and ideas, and frequently elect to do so, rather than by verbal and/or personal interactions. At the same time, persons exceedingly express feelings of being isolated or alone despite their own personal choice to use mobile devices as their primary means of communicating. Many mobile apps also require a user to provide personal information, and/or permit the app provider to track the location of the user, which raises privacy concerns and increases the risk that the users' sensitive information be exposed in a data breach. Additionally, as the number of mobile apps on users' phones continues to increase, the time a user spends in trying to find a particular app also increases.

There is an increasing need in today's society to monitor a subject's (e.g. customer's, patient's) real-time experience at a location (e.g. restaurant, hospital, hotel, car dealership, sports stadium or arena, gas station), and receive real-time feedback from such subjects, particularly as subjects engage and communicate more openly with mobile devices than with other subjects. Subjects frequently tend to avoid public conflicts and rarely provide negative feedback at the location in which their negative experience occurred. Owners, managers, and employees' understanding the real-time experiences of subjects in a closed system, and prior to subjects providing negative or neutral feedback to the public via conventional techniques, is becoming increasingly important. For example, when a family with children dines out at a restaurant, and a server happens to be inattentive at any point during their experience at the restaurant (e.g., after being seated and prior to taking drink and/or food orders, while waiting for food to be delivered and while drinks are being finished, after food has been delivered to see if anything else (e.g., condiments, silverware, etc.) is needed to enjoy the meal, while dinner is being eaten and drinks are being finished, once dinner is completed to inquire about whether any dessert or just the check is desired, after the check has been delivered, etc.), a parents' struggle to keep their children well-behaved for extended periods without food, drink, or something to occupy them, is exacerbated and leads to unpleasant, avoidable experiences. Indeed, these experiences are well within the restaurant's ability to rectify, but outside of both the parents', and the restaurant's supervisor's, ability to inconspicuously, simply, efficiently communicate a real-time experience issue with each other.

Various conventional techniques for a location receiving feedback from a subject as to their experience at the location exist and rely on mobile applications (e.g. Yelp®), or customer surveys/reviews/questionnaires physically provided to the user (e.g., left in a hotel room, accompanying the bill at a restaurant, etc.) or sent over e-mail, by text message, or on a website (e.g. a private business website, an aggregator website (e.g. Hotels.com®, TripAdvisor®, OpenTable®). For example, hospitals ask patients to fill out patient survey questionnaires as they are leaving the hospital. However, these conventional mobile application and customer survey techniques do not capture the real-time experience of the subject. Additionally, customer surveys/reviews/questionnaires often require the subject to answer multiple questions, which can be time consuming for a subject and result in annoyance or a subject not providing the valuable feedback at all. Such conventional techniques also require command of the English language and thus can be subject to misinterpretation by the customer, the location issuing the questionnaire, or both.

Individuals, businesses, and even government agencies' use of social media platforms (e.g. Twitter®, Facebook®) has also become ubiquitous. These conventional platforms permit subjects to publicly and widely communicate feedback about their experiences at locations in real-time. However, conventional mobile application, customer survey, and social media feedback techniques also do not provide the owners, managers, and/or employees at a location with a real-time and local monitoring mechanism to ensure that the subject is having a positive experience while the subject is still at the location. These conventional techniques are also ineffective at controlling subjects' dissemination of feedback on their respective experience to the general public prior to the subjects leaving the location and prior to the owners, managers, and/or employees at the location having a chance to improve the subjects' respective experiences in real-time and without public dissemination of negative feedback. The widespread dissemination of negative feedback via conventional techniques may rapidly damage the reputation of a location, and is costly, and both labor and time-intensive, to rectify and improve. These conventional techniques are also ineffective at permitting locations to rectify a subject's experience before they leave the location; rather, by the time the location is aware of a subject's negative experience, it is often too late to address in real-time. Conventional survey techniques demand the subject's resources (e.g., time, command of English (or any) language, effort, etc.) which can serve to annoy the subject even more, have the subject avoid providing this valuable feedback to the location directly, and/or increase the likelihood that the subject provides negative feedback on their own time, in a way most convenient to them, and to the general public.

The present disclosure is directed to a portable real-time experience communications device and a closed monitoring system that provides real-time, controlled, language-proof, inconspicuous, experience feedback information, in a subject-friendly manner, at any time during a subject's interaction at a location and prior to a subject leaving a location, and that avoids the location's receipt of untimely and public feedback, and necessity to perform costly, and labor and time-intensive, rectifications, that are associated with prior art feedback techniques.

SUMMARY

In some embodiments, a system for real-time user experience monitoring and response includes a plurality of portable communications devices and a centralized communications and display device. Each of the plurality of portable communications devices includes a plurality of actuators disposed on a surface of the respective portable device, each actuator configured to, when activated by a subject, generate an electronic signal indicating the activation of the respective actuator. Each of the plurality of portable communications devices may also include a processor and a non-transitory machine-readable storage medium encoded with program code executable by the processor for determining a time relative to the activation of the respective actuator and for generating an alert on the respective portable device in response to receiving the generated electronic signal. Each of the plurality of portable communications devices also includes a transmitter configured to transmit data over a network in response to receiving the generated electronic signal. The transmitted data includes an identifier of the respective activated actuator, an indicator of the determined time, and an identifier of the respective portable device.

In some embodiments, the centralized communications and display device includes a communications interface configured to be coupled to the network and to receive the respective transmitted data over the network from each of the transmitters of each of the portable devices. The centralized communications and display device also includes a processor coupled to the communications interface and a non-transitory machine-readable storage medium encoded with program code executable by the processor for generating respective machine-readable values indicative of one of a plurality of experience types for each of the portable device users using the received data at the communications interface and for generating an alert for a respective portable device user using the generated machine-readable values and if the indicated one experience type for the respective portable device user matches or exceeds a threshold experience type.

In some embodiments, a computer-implemented method for real-time monitoring and responding to user experiences at a location includes deploying a centralized communications and display node, and each of a plurality of portable communications devices with a respective subject of a plurality of subjects, within the location, and receiving, over a network, from one or more of the plurality of portable devices, and at the centralized communications and display node, transmitted data. In various embodiments, the transmitted data includes a respective identifier of one of a respective plurality of actuators disposed on the surface of each of the one or more portable devices and that was activated by the respective subject, a respective indicator of the activation time of the respective one actuator of each of the one or more portable devices, and a respective identifier of each of the one or more portable devices. In some embodiments, the computer-implemented method also includes generating, at the centralized communications and display node, respective machine-readable values indicative of either a positive experience type or a negative experience type for each of the actuator-activating subjects using the received data, and generating, at the centralized communications and display node, a respective alert for each of the actuator-activating subjects using the generated machine-readable values and if the indicated experience type for the respective actuator-activating subject is a negative experience type.

DETAILED DESCRIPTION

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description only and do not require that a system or apparatus be constructed or operated in a particular orientation. Terms such as "attached," "connected", "coupled", and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components.

As used herein, use of a singular article such as "a," "an" and "the" is not intended to exclude pluralities of the article's object unless the context clearly and unambiguously dictates otherwise.

The inventor has determined that the solutions described herein provide simple, inexpensive, portable communications devices which provide real-time experience information to location owners, managers, and/or employees while the subjects (e.g., customers, patients) are continuing to interact with the location of interest, at any point in time during that interaction, and in a manner which is highly, and inexpensively, scalable and permits the location owners, managers, and/or employees to address any negative experiences of the customers and/or patients in real-time and prior to them leaving the location of interest. The real-time experience information may be subject-specific (e.g. customer-specific, patient-specific). The solutions described herein avoid public, negative experience reviews provided by such subjects that are often received, and require substantial efforts to rectify, with conventional feedback technology. The solutions described herein also provide locations with data rich collection technology which may be utilized to focus and prioritize a location's limited resources on the most impactful items at any given time. For example, the solutions described herein provide simple, inexpensive, portable communications devices which provide patient-specific experience information to a hospital (and doctors, nurses, managers, and other employees of such hospital) in real-time, at any given point in time throughout the duration of the patient's stay at the hospital, and prior to the patient leaving the hospital. The solutions described herein provide the opportunity for the hospital and the patient to discuss any satisfaction items (positive or negative) in real-time, within moments after the experience information is communicated, and prior to the patient's departure from the hospital. The solutions described herein are also easily provisioned to the specific location employee servicing/treating the subject, and/or the specific subject area within a location (e.g., table/section/seat where the subject is seated within a restaurant, stadium, store, dealership, arena, pump the subject is using at a gas station, room the subject is staying at a hotel, etc.). In this manner, subject experience data can be attributed to a particular location employee and/or intra-location area, and can be aggregated to provide location supervisors with performance metrics. The solutions described herein are not prone to language barriers by subjects, and permit the subject to provide feedback to the location of interest in a rapid, simple, inconspicuous, and subject-friendly manner as opposed to conventional lengthy, question-based surveys.

Figure 1:
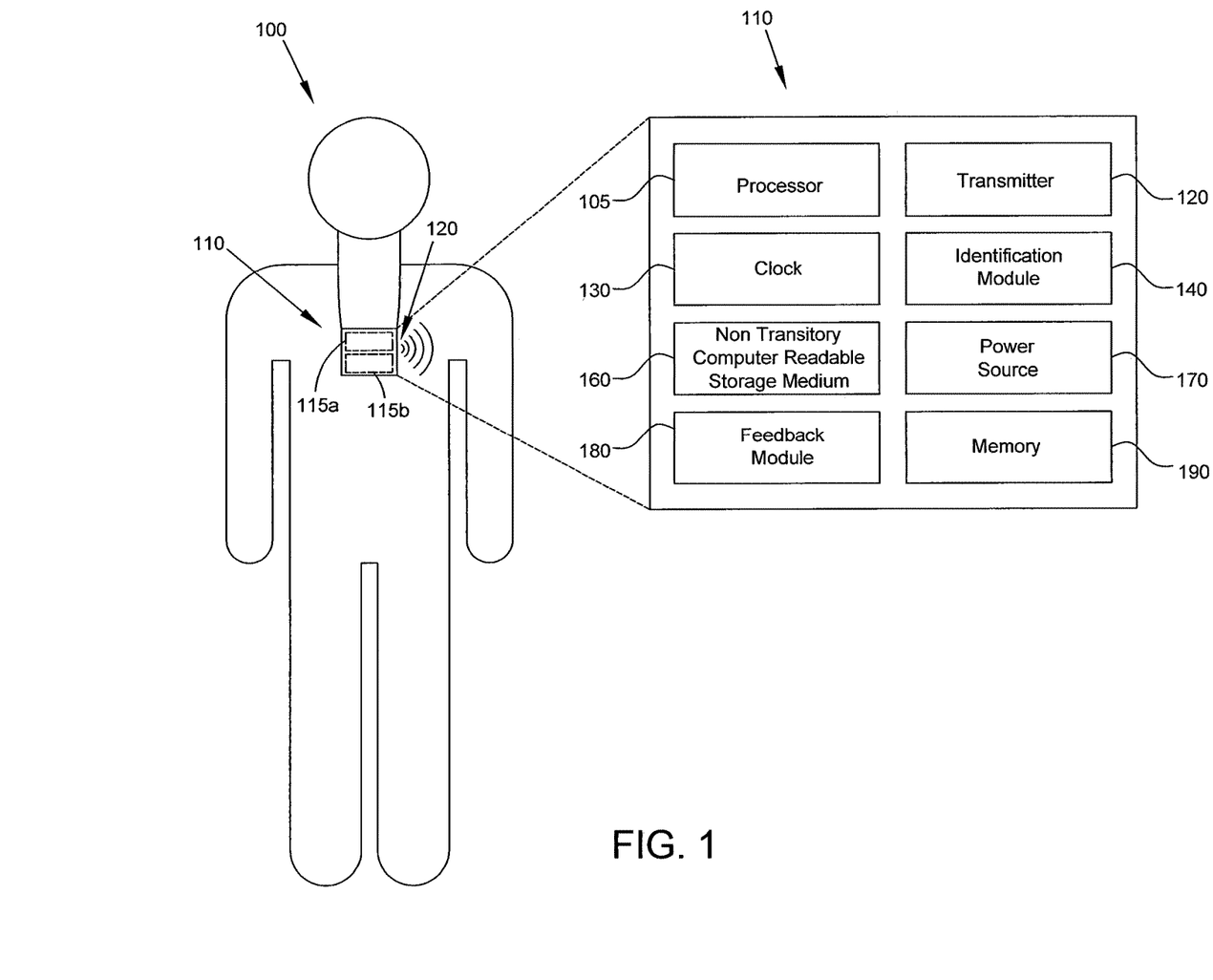
FIG. 1 is a block diagram of an example of a portable communications device in accordance with some embodiments of the present disclosure.

Referring now to FIG. 1, a block diagram of an example of a portable communications device in accordance with some embodiments of the present disclosure is provided. In various embodiments, portable communications device 110 is a mobile, real-time experience communications device. In various embodiments, portable communications device 110 is a small (relative to a subject 100), low cost, and disposable device. Subject 100 may be a customer or patient at a location (not shown) in which an owner, manager, or employee of the location is interested in receiving real-time feedback from the subject 100 while the subject 100 interacts with the location such as, for example, a restaurant, a hotel, a car dealership, a hospital, a sports stadium or arena, a gas station, etc. The inventor has observed that such a low cost, disposable portable communications device provides benefits in many settings especially where cleanliness, concerns for infection, germs, etc., concerns for lost, stolen, or damaged devices, etc. is a concern for owners, managers, and/or employees of the location. In various embodiments, portable communications device 110 may be configured to be disposed on a subject (e.g. a human patient, a human customer) such as, for example, as shown in FIG. 1, by being coupled to a lanyard that is configured to be disposed around a neck, or other suitable body location, of a subject 100. In various embodiments, portable communications device 110 may be configured to be disposed on a subject in any suitable manner such as, for example, in a pocket of an article of clothing worn by a subject 100, on a pocket of an article of clothing worn by a subject 100 (e.g. via a clip, pin, magnet, adhesive, or other securing mechanism). In various embodiments, portable communications device 110 is disposed in an area in proximity of a subject 100 such as, for example, disposed (e.g. via a clip, pin, magnet, adhesive, or other securing mechanism) on a bed, a table, a door, a desk, etc. in proximity of subject 100.

In various embodiments, portable communications device 110 includes a plurality of actuators 115 (e.g. 115a, 115b) disposed on a surface of the portable communications device 110. In various embodiments, actuators 115 are configured to be activated by operation by a subject 100. Any suitable actuator 115 may be utilized such as, for example, a button configured to be depressed by a subject 100, a switch configured to be switched by a subject 100, a touch-screen actuator, etc. In various embodiments, the plurality of actuators 115 may include a positive experience actuator 115a and a negative experience actuator 115b. In various embodiments, each actuator includes a visual identifier on a surface of the respective actuator. In some embodiments, for example, a positive experience actuator 115a includes a visual smiling face identifier on a surface of the respective actuator 115a, and a negative experience actuator 115b includes a visual frowning face identifier on a surface of the respective actuator 115b. In some embodiments, for example, a positive experience actuator 115a includes a universally known word like "GOOD" on a surface of the respective actuator 115a, and a negative experience actuator 115b includes a universally known word like "BAD" on a surface of the respective actuator 115b. In various embodiments, the actuators 115 on the portable communications device 110 provide a binary option to the subject—positive or negative only. In some embodiments, the plurality of actuators 115 includes a neutral experience actuator. Any suitable visual identifier for any suitable experience actuator may be utilized such as, for example, a visual plus (+) sign for a positive experience actuator, a visual minus (-) sign a negative experience actuator, a visual identifier (e.g. visual face) for a temperature or condition experience (e.g. sick, cold, hot, etc.), a visual identifier (e.g. visual face or clock) of a time experience, such as, for example, of waiting longer than expected, etc. The inventor has determined that actuators with visual identifiers, as opposed to conventional, lengthy or question-based surveys, permits subjects to conveniently, easily, efficiently, inconspicuously, and in real time, assess their instant experience level and communicate it, without requiring the subject to have command of the English (or any) language.

In various embodiments, each actuator (e.g. 115a, 115b) of a portable communications device 110 is configured to, when activated by a subject 100, generate an electronic signal indicating the activation of the respective actuator (e.g. 115a, 115b). In various embodiments, portable communications device 100 includes a plurality of sensors (not shown) and each sensor is configured to detect the activation of a respective actuator (e.g. 115*a*, 115*b*) based on operation of the actuator (e.g. being depressed, being switched, etc.) by a subject 100. In various embodiments, each of the plurality of sensors (not shown) is configured to generate an electronic signal indicating the activation of the respective actuator (e.g. 115*a*, 115*b*) when the associated sensor detects the activation of the respective actuator (e.g. 115*a*, 115*b*).

In various embodiments, as illustrated in FIG. 1, portable communication device 110 includes a processor 105, a non-transitory machine-readable storage medium 160, and a transmitter 120. The non-transitory, machine-readable storage medium 160 may be a non-transitory computer-readable storage medium. In various embodiments, non-transitory machine-readable storage medium 160 is encoded with program code executable by the processor 105 of the portable communication device 110. In various embodiments, as illustrated in FIG. 1, portable communication device 110 includes a clock 130, an identification module 140, a power source 170, a feedback module 180, and a memory 190. The processor 105 and memory 190 of centralized communications and display node 250 may be supplemented by, or incorporated in, special purpose logic circuitry. In various embodiments, processor 105 controls the operation of transmitter 120, clock 130, identification module 140, power source 170, feedback module 180, and/or memory 190. In some embodiments, portable communication device 110 includes location functionality and can receive inputs from sensors (not shown) to determine positioning information for the portable communication device 110.

In various embodiments, non-transitory, machine-readable storage medium 160 is encoded with program code executable by the processor 105 for determining a time relative to the activation of the respective actuator (e.g. 115*a*, 115*b*) of the portable communications device 110. In various embodiments, determining a time relative to the activation of the respective actuator (e.g. 115*a*, 115*b*) is based on a current time input provided by clock 130. In various embodiments, determining a time relative to the activation of the respective actuator (e.g. 115*a*, 115*b*) is based on an activation input provided by a respective sensor (not shown) for the respective actuator (e.g. 115*a*, 115*b*). In various embodiments, the time relative to the activation of the respective actuator (e.g. 115*a*, 115*b*) comprises the time of receipt of the generated electronic signal at the processor 105.

In various embodiments, non-transitory, machine-readable storage medium 160 is encoded with program code executable by the processor 105 for generating an alert on portable communications device 110 in response to receiving the generated electronic signal indicating the activation of the respective actuator (e.g. 115*a*, 115*b*) of portable communications device 110. In various embodiments, the generated alert is designed to provide a confirmation to subject 100 that the respective actuator (e.g. 115*a*, 115*b*) was activated so that, for example, the subject understands that the respective actuator does not need to be activated again. In various embodiments, generating an alert is based on a feedback input provided by feedback module 180, and, for example, based on a feedback setting of feedback module 180. In various embodiments, a feedback setting of feedback module 180 is programmable. In some embodiments, a feedback setting of feedback module 180 is coded in firmware or hardware. In various embodiments, a feedback setting of feedback module 180 is remotely programmable from a centralized node (e.g. centralized communications and display node 250 (FIG. 2)). In various embodiments, feedback settings of feedback module 180 are programmed or coded to be set and/or change based on, for example, a time of day (e.g. based on an input from clock 130), a location, etc.

Any suitable alert may be generated by processor 105. For example, in various embodiments, portable communications device 110 includes a speaker (not shown) and the alert generated by processor 105 of portable communications device 110 is an audible notification (e.g. a beep). In various embodiments, portable communications device 110 includes a display (not shown) and the alert generated by processor 105 of portable communications device 110 is a visual notification. In some embodiments, the visual notification generated in response to receiving the generated electronic signal indicating the activation of a respective actuator 115*a* is a light on an external surface of the actuator, or a backlight that illuminates a surface of the actuator. For example, visual notification generated in response to receiving the generated electronic signal indicating the activation of a positive experience actuator may be a smiling face lit in color (e.g. green) and of a negative experience actuator 115*a* may be a frowning face lit in color (e.g. red, orange). In various embodiments, portable communications device 110 includes haptic technology (not shown) and the alert generated by processor 105 of portable communications device 110 is a haptic notification (e.g. a vibration). In various embodiments, the alert generated by processor 105 is a combination of notifications, including, for example, a combination of two or more of a visual notification, an audible notification, and a haptic notification. For example, feedback settings of feedback module 180 may be programmed or coded to change from a visual notification (e.g. when an input from clock 130 indicates that the time is after sunset and before sunrise) to an audible and/or haptic notification (e.g. when an input from clock 130 indicates that the time is after sunrise and before sunset).

In various embodiments, transmitter 120 of portable communications device 110 is configured to transmit data over a network (not shown) in response to receiving the generated electronic signal indicating the activation of the respective actuator (e.g. 115*a*, 115*b*) of portable communications device 110. In various embodiments, transmitter 120 includes communication protocols to send and receive transmitted data using Bluetooth Low Energy (BLE), LTE Direct, WiFi, or another short range communication protocol. In various embodiments, transmitter 120 may communicate with a communications interface of a centralized communications and display node (as further described below with reference to FIG. 2). In various embodiments, suitable secure communication techniques may be utilized to communicate transmitted data between transmitter 120 and a communications interface of a centralized communications and display node such as, for example, secure communication methods employing asymmetric or symmetric encryption techniques, message authentication codes, secure hashing algorithms, or combinations thereof using, for example, a network security protocol such as, for example, SSL or TLS.

In various embodiments, portable communications device 110 only includes functionality to transmit data but cannot receive data. In some embodiments, the portable communication device 110 is a low cost device which provides transmitted data over a secure (e.g. encrypted) wireless network connection for receipt by a communications interface (e.g. wireless communications interface) of one or more centralized communications and display nodes (as further described below with reference to FIG. 2). In some embodiments, the portable communication device 110 does not have functionality to receive data from a communications interface of a centralized communications and display node. In some embodiments, the portable communication device 110 includes functionality to receive data from a communications interface of a centralized communications and display node.

In various embodiments, the transmitted data from transmitter 120 includes an identifier of the respective activated actuator (e.g. 115a, 115b). In various embodiments, the transmitted data includes an indicator of the time determined by processor 105 relative to the activation of the respective actuator (e.g. 115a, 115b). In various embodiments, the transmitted data includes an identifier of the portable communications device 110. In various embodiments, an identifier of the portable communications device 110 and/or an identifier of each actuator (e.g. 115a, 115b) of the portable communications device is based on a setting in identification module 140. In various embodiments, each actuator (e.g. 115a, 115b) has a unique identifier, and each portable communications device 110 has a unique identifier. In some embodiments, identification module 140 interfaces with a programmable memory 190 to store a unique identifier associated with the portable communications device 110 and each actuator (e.g. 115a, 115b). The identification module 140 may be programmable by a user using a suitable user interface (not shown). In some embodiments, the identification module 140 may be programmable over the air (e.g. a secure wireless network connection) by a user of a centralized communications and display node (as further described below with reference to FIG. 2). In various embodiments, each unique identifier may be randomly generated or selectable by a user. In various embodiments, identification module 140 may also be programmed with additional identifying information suitable for the circumstances. In various embodiments, a secure (e.g. encrypted) wireless network connection between a portable communication device 110 and a centralized communications and display node (as further described below with reference to FIG. 2) securely identifies the portable communication device 110, and the respective activated actuator, to a centralized communications and display node (as further described below with reference to FIG. 2).

For example, portable communications device 110 may include a radio-frequency identification (RFID) module (not shown). In various embodiments, a RFID module (not shown) includes an RFID tag associated to a unique identification string for each portable communications device 110 and for each actuator (e.g. 115a, 115b) of each portable communications device 110. In various embodiments, a RFID module (not shown) may broadcast its unique identification string for registration purposes with a centralized communications and display node (250, described in more detail below regarding FIG. 2). In various embodiments, a RFID module (not shown) can include a Quick Response (QR) code, or other suitable barcode, disposed, for example, on a surface of a housing of a portable communications device 110 and/or on a surface of each actuator (e.g. 115a, 115b). In various embodiments, the QR code, or other suitable barcode, may be configured to store information such as, for example, a date of manufacture of portable communications device 110 and/or of each actuator (e.g. 115a, 115b) of portable communications device 110, model number of portable communications device 110 and/or of each actuator (e.g. 115a, 115b) of portable communications device 110, that can be communicated to (e.g. wirelessly and/or optically read by) an external reader configured to read and process the QR code or other suitable barcode. In various embodiments, each portable communications device 110 may be registered and assigned via RFID, QR Code, barcode, or similar identifiers, with subjects' (e.g. subject 100) biometric information, and/or subject identifying information (e.g. photos, audio, video), in real-time and in a location (not shown) including one or more centralized communications and display node (as further described below with reference to FIG. 2). In various embodiments, portable communications device 110 may include a biometric module (not shown). In various embodiments, a biometric module (not shown) includes one or more biometric sensors such as, for example, a fingerprint sensor, configured to receive biometric data from a subject 100 or an employee. In various embodiments, a biometric module (not shown) is configured to sense and/or process biometric data, for processing, storage, and/or transmission to a centralized communications and display node (as further described below with reference to FIG. 2). In various embodiments, a portable communications device 110 may include a reader to read and process QR codes or other suitable barcodes. In various embodiments, each portable communications device 110 may be registered and assigned via RFID, QR Code, barcode, or similar identifiers, with respective employee (not shown) biometric information, and/or employee identifying information (e.g. photos, audio, video), in real time (e.g. when a respective employee checks in for a shift, when a respective employee is assigned to service a subject, etc.) in a location (not shown) including one or more centralized communications and display node (as further described below with reference to FIG. 2). In various embodiments, each portable communications device 110 may be registered and assigned via RFID, QR Code, barcode, or similar identifiers, with intra-location area identifying information (e.g. table, seat, section, pump, room, etc.) in real-time (e.g. at the time a subject checks into the location and receives the device, at the time a subject is seated in the respective intra-location area, etc.,), in a location (not shown) including one or more centralized communications and display node (as further described below with reference to FIG. 2).

In various embodiments, non-transitory, machine-readable storage medium 160 is encoded with program code executable by the processor 105 for determining a connection status of transmitter 120 of a portable communications device 110 over the network (e.g. secure wireless network). In various embodiments, non-transitory, machine-readable storage medium 160 is encoded with program code executable by the processor 105 for determining a connection status between the transmitter 120 and a communications interface of a centralized communications and display node (as further described below with reference to FIG. 2). In various embodiments, non-transitory, machine-readable storage medium 160 is encoded with program code executable by the processor 105 for determining an encryption status of the network connection between transmitter 120 of a portable communications device 110 and a communications interface of a centralized communications and display node (as further described below with reference to FIG. 2). In various embodiments, if processor 105 determines that the status of the network connection from transmitter 120 is down, or that the status of encryption of such network connection is down, program code executable by the processor 105 may buffer, in memory 190 at the portable communications device 110, all of a portion of the data that would otherwise have been transmitted from transmitter 120 if the network connection was up (or if the network connected was encrypted). For example, buffered data in memory 190 at the portable communications device 110 may include, for example, the identifier of the respective activated actuator (e.g. 115a, 115b), the indicator of the time determined by processor 105 relative to the activation of the respective actuator (e.g. 115a, 115b), the identifier of the portable communications device 110, the identifier of the subject (or employee, intra-location area) assigned to the portable communications device 110, etc. In various embodiments, if processor 105 determines that the status of the network connection from transmitter 120 is down, or that the status of encryption of such network connection is down, program code executable by the processor 105 may generate an alert (e.g. visual notification, audible notification, haptic notification) at the portable communications device 110 as described above and, for example, based on an input from feedback module 180. In various embodiments, if processor 105 determines that the status of the network connection from transmitter 120 is restored, or that the encryption status of such network connection is restored, program code executable by the processor 105 may send the buffered data in memory 190 to transmitter 120 for transmission over the network (e.g. secure wireless network) as transmitted data.

In various embodiments, processor 105 controls the operation of the portable communication device 110, including the operation of the identification module 140, power source 170, and feedback module 180, but does not have functionality to determine its location. In some embodiments, processor 105 includes location functionality and can receive inputs from external sensors (not shown) to determine positioning information for the portable communication device 110. In various embodiments, portable communication device 110 may include functionality to determine its own positioning information. For example, in some embodiments, a portable communication device 110 may include a GPS receiver to determine its latitude and longitude. In some embodiments, a portable communication device 110 may include timing functionality to determine its location based on well-known time of arrival (TOA) and time difference of arrival (TDOA) techniques. In some embodiments, a portable communication device 110 may also include discrete antenna elements in order to determine the angle of arrival (AOA) of received transmission. In some embodiments, a portable communication device 110 may include an accelerometer to detect and quantify movement of the device 110. In some embodiments, a portable communication device 110 may include functionality to determine its location from sensors included in the device 110, or may send the positioning measurements from the sensors as transmitted data over the air (e.g. over a secure wireless network) such as, for example, to the centralized communications and display node for processing. In various embodiments, the transmitted data from transmitter 120 may include a location, and/or location-related information, of portable communication device 110.

In various embodiments, power source 170 may include a rechargeable battery that provides power to all modules of the portable communication device 110. The battery may be rechargeable using any suitable recharging techniques include solar, kinetic energy harvesting, RF harvesting, wireless charging, or using an AC adapter. The use of a battery power source 170 allows portability of the portable communication device 110 for many different locations and applications. In some embodiments, the power source 170 may include a rechargeable lithium ion battery. In various embodiments, power source 170 includes a removable battery. In various embodiments, power source 170 includes a non-removable battery. In various embodiments, especially for locations where cleanliness is important (e.g. sterile hospital location), power source 170 may be wirelessly rechargeable such that portable communication device 110 includes no penetrating surfaces.

Figure 2:
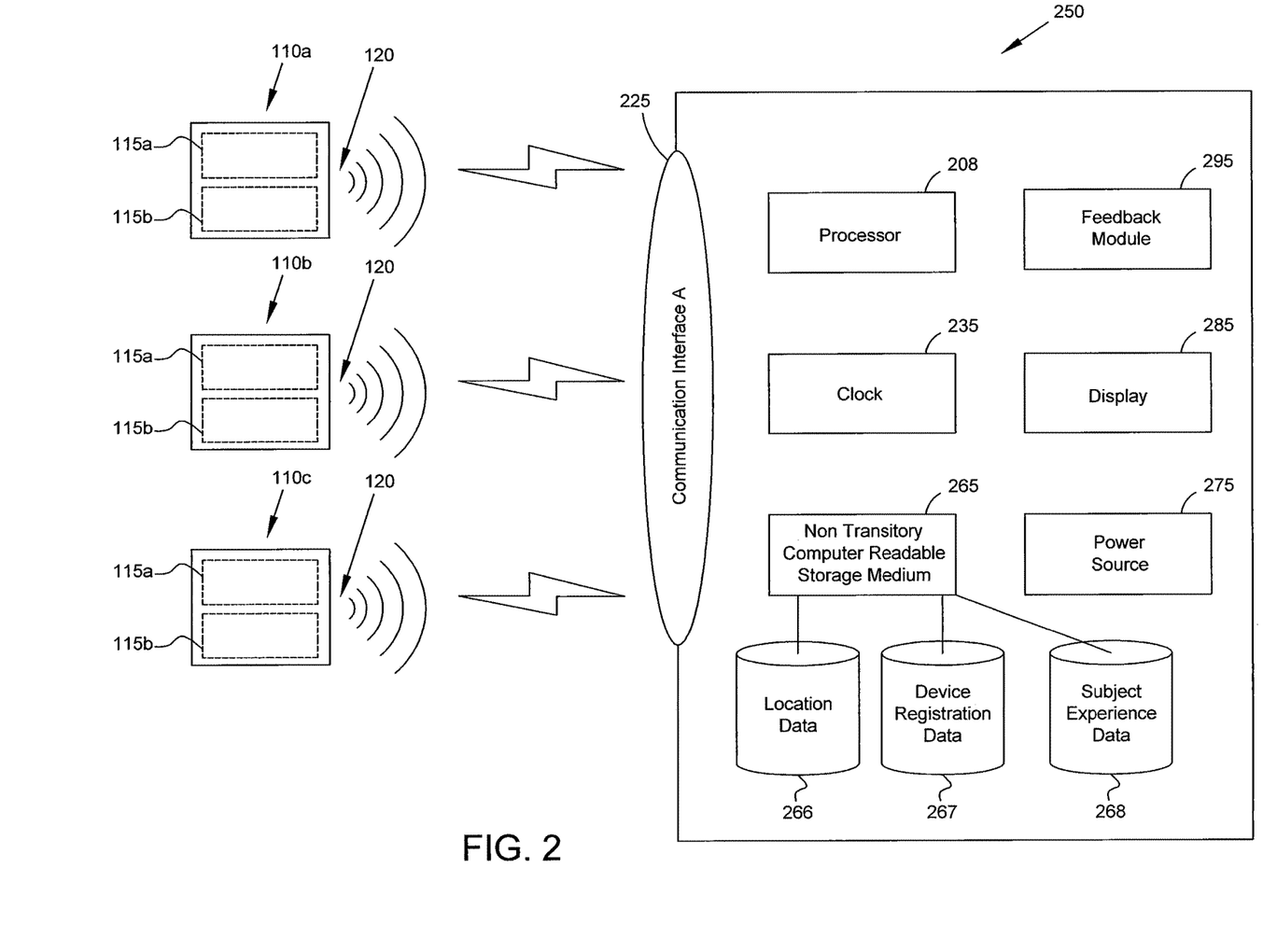
FIG. 2 is a block diagram of an example of a system for real-time user experience monitoring according to some embodiments of the present disclosure.

Referring now to FIG. 2, a block diagram of an example of a system for real-time user experience monitoring according to some embodiments of the present disclosure is provided. Various embodiments of the present disclosure provide a networked environment as shown in FIG. 2 that includes a plurality of portable communication devices 110a-110c disposed on or in proximity of a plurality of subjects (e.g. a plurality of subjects 100), one or more centralized communications and display node 250 in communication over a network with the plurality of portable communication devices 110a-110c via a communications interface 225. As shown in FIG. 2, a system 200 may include a plurality of portable communication devices 110a-110c. In various embodiments, each portable communication device 110a-110c includes a plurality of actuators (e.g. 115a, 115b) disposed on a surface of the respective communication device as described above for FIG. 1.

As shown in FIG. 2, a system 200 may include a centralized communications and display node 250. In various embodiments, centralized communications and display node 250 may include any suitable device such as, for example, a laptop, a personal computer, a smart phone, a smart watch, a personal digital assistant, a cellular phone, a tablet, an electronic personal planner, a slate tablet, a booklet computer, a convertible notebook, a phablet, a command and control system having a common operational picture (COP) or other situational awareness display, a human-wearable computing device, etc. In various embodiments, centralized communications and display node 250 operates an application (e.g. a software application, web application, native application, or mobile application) that is configured to display via display 285 (e.g. a graphical user interface), portable communication device (e.g. 110a-110c) registration and binding to respective subjects (e.g. 100), employees, and/or intra-location areas, alerts associated with activation of a respective actuator (e.g. 115a, 115b) of a respective portable communication device (e.g. 110a, 110b, 110c), and/or various customization options. In various embodiments, a respective unique identifier of each portable communication device (e.g. 110a-110c) is bound to a respective subject (e.g. a respective subject's biometric information, or other subject identifying information (e.g. name)), respective employee (e.g. a respective employee's biometric information, or other employee identifying information (e.g. name)), and/or subject area proximity intra-location information (e.g. table/section/seat identifying information where the subject is assigned to be seated, pump where the subject is assigned to pump his gas, room where the subject is assigned to stay, etc.)), at the time that the respective portable communication device is handed out to the respective subject (e.g. by the hostess, gas station employee, greeter at the store, check-in to the hotel, check-in to the hospital, by the respective employee servicing the respective subject at their assigned table/section/seat/room). In various embodiments, an application operating on centralized communications and display node 250 displays a real-time record for each subject (e.g. 100) via display 285, including, for example, identifying information for the subject 100, identifying information for the employee servicing the subject, identifying information (e.g. table, section, seat, room) for the intra-location area assigned to the subject, an identifier for the corresponding portable communication device (e.g. 110a, 110b, 110c), an identifier for the respective actuator (e.g. 115a, 115b) (if currently activated by the subject on the corresponding portable communication device (e.g. 110*a*, 110*b*, 110*c*)), descriptive data for the respective activated actuator (if currently activated), geolocation data for the corresponding portable communication device (e.g. 110*a*, 110*b*, 110*c*), etc.

In various embodiments, centralized communications and display node 250 includes a communications interface 225 configured to be coupled to the network and to receive respective transmitted data over the network from each of the transmitters 120 of each of the portable communication devices 110*a*, 110*b*, 110*c*. In various embodiments, communications interface 225 includes communication protocols to receive transmitted data from respective transmitters 120 of portable communication devices 110*a*, 110*b*, 110*c* using Bluetooth Low Energy (BLE), LTE Direct, WiFi, or another short range communication protocol. In various embodiments, suitable secure communication techniques may be utilized to communicate transmitted data between each of the transmitters 120 of each of the portable communication devices 110*a*, 110*b*, 110*c* and communications interface 225 of centralized communications and display node 250 such as, for example, secure communication methods employing asymmetric or symmetric encryption techniques, message authentication codes, secure hashing algorithms, or combinations thereof using, for example, a network security protocol such as, for example, SSL or TLS. In some embodiments, communications interface 225 only includes functionality to receive data but cannot transmit data. In various embodiments, communications interface 225 includes functionality to transmit and receive data. In various embodiments, communications interface 225 may be additionally configured to receive and/or transmit data over another network (e.g. over another wireless network, the Internet, a cloud computing network) to, for example, a centralized repository, centralized server, etc.

In various embodiments, centralized communications and display node 250 includes a processor 208 coupled to the communications interface 225. In various embodiments, processor 208 controls the operation of the centralized communications and display node 250, including the operation of the display 285, and power source 275. In various embodiments, processor 208 controls the operation of modules of the centralized communications and display node 250 including, for example, a feedback module 295, an identification module (not shown), a location module (not shown), and/or a forensics module (not shown). In various embodiments, centralized communications and display node 250 includes a non-transitory machine-readable storage medium 265 encoded with program code executable by the processor 208 of the centralized communications and display node 250. The non-transitory, machine-readable storage medium 265 may be a non-transitory computer-readable storage medium. Computer-readable media suitable for storing computer program code and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor 208 and memory (not shown) of centralized communications and display node 250 may be supplemented by, or incorporated in, special purpose logic circuitry.

In various embodiments, non-transitory machine-readable storage medium 265 is encoded with program code executable by the processor 208 of the centralized communications and display node 250 for generating respective machine-readable values indicative of one of a plurality of experience types for each of the users (e.g. subjects 100) of the portable communication devices 110*a*, 110*b*, 110*c* using the received data at the communications interface 225. The plurality of experience types for each of the users (e.g. subjects 100) are described above with reference to FIG. 1.

In various embodiments, non-transitory machine-readable storage medium 265 is encoded with program code executable by the processor 208 of the centralized communications and display node 250 for generating an alert for a respective user (e.g. subject 100) of a respective portable communication devices (e.g. 110*a*, 110*b*, 110*c*) using the generated machine-readable values and if the indicated one experience type (e.g. positive experience type, negative experience type, etc.) for the respective user (e.g. subject 100) matches or exceeds a threshold experience type. In various embodiments, a user of a centralized communications and display node 250 (e.g. an owner, manager, or employee of a location that is interested in receiving real-time feedback from a subject 100 while the subject 100 interacts with the location and throughout the duration of the interaction) stores threshold experience types (e.g. positive experience actuator identifiers, negative experience actuator identifiers, neutral experience actuator identifiers, etc.) in a subject experience repository. In various embodiments, processor 208 may compare stored threshold experience types to, for example, a received identifier of a respective actuator (e.g. 115*a*, 115*b*) on the portable communication device (e.g. 110*a*, 110*b*, 110*c*) corresponding to the subject (e.g. 100). In various embodiments, a location supervisor user of a centralized communications and display node 250 (e.g. an owner or manager of a location that is interested in receiving real-time feedback from subjects 100 while the subjects 100 interact with a particular employee, or in a particular area of, the location and throughout the duration of the interaction) stores threshold experience types (e.g. positive experience actuator identifiers, negative experience actuator identifiers, neutral experience actuator identifiers, etc.) in an employee experience repository, or in an intra-location area experience repository.

In various embodiments, generating an alert for a respective user (e.g. subject 100) of a respective portable communication device (e.g. 110*a*, 110*b*, 110*c*) includes, for example, changing a display 285 at the centralized communications and display node 250 or providing a notification message (e.g. email message, text message) to an owner, manager, and/or employee that is at the location but, for example, not continuously monitoring the centralized communications and display node 250. In various embodiments, generating an alert is based on a feedback input provided by feedback module 295 of centralized communications and display node 250, and, for example, based on a feedback setting of the feedback module 295. In various embodiments, a feedback setting of feedback module 295 of centralized communications and display node 250 is programmable such as, for example, via display 285 of centralized communications and display node 250. In some embodiments, a feedback setting of feedback module 295 of centralized communications and display node 250 is coded in firmware or hardware.

In various embodiments, feedback settings of a feedback module 295 of centralized communications and display node 250 are programmed or coded to be set and/or change based on, for example, a time of day (e.g. based on an input from clock 235), a location, etc. For example, in various embodiments, managers and/or employees at the location work in shifts and feedback settings of feedback module 295 of centralized communications and display node 250 may be programmed to include, for example, the email address or phone number of one or more managers and/or employees on shift at the time that transmitted data is received from one or more portable communication devices (e.g. 110*a*, 110*b*, 110*c*). In various embodiments, non-transitory machine-readable storage medium 265 is encoded with program code executable by the processor 208 of the centralized communications and display node 250 for modifying the alert generated for the respective portable communications device user (e.g. subject 100) based on the bindings generated by processor 208 between respective portable communications devices (e.g. 110*a*, 110*b*, 110*c*) and respective portable communications device users (e.g. subjects 100, location employees (not shown) servicing such subjects, the respective table/section/seat/room where the respective subject 100 is being serviced, etc.).

The inventor has observed that the highly scalable solutions described herein permit a centralized communications and display node 250 user to understand the satisfaction of a plurality of subjects (e.g. 100) in a location of interest to the user by receiving experience information in real-time, while the subjects are continuing to interact with the location of interest, and at any moment in time during such interaction. The inventor has also observed that the solutions described herein provide owners, managers, and employees of locations with real-time, experience information which provide the opportunity for such persons to discuss any satisfaction items (positive or negative) in real-time with a respective subject, while any problems with the respective subject's experience can be addressed and/or remedied, and prior to the subject leaving the location, to rapidly improve a respective subject's experience at the location, and to prioritize a location's limited resources on the most impactful and critical subject experiences at any given time. The inventor has also observed that the solutions described herein provide managers and owners of locations with attribution data, for example, for their employees (based on the experiences communicated by the respective subjects serviced by a respective employee, bindings between devices and such employees, correlated times of the communicated experiences and shift schedules for such employees, etc.), and/or for intra-location areas (based on the experiences reported by the respective subjects serviced by a respective employee, bindings between devices and such areas, etc.).

In various embodiments, non-transitory machine-readable storage medium 265 is encoded with program code executable by the processor 208 of the centralized communications and display node 250 for generating a plurality of bindings between respective portable communications devices (e.g. 110*a*, 110*b*, 110*c*) and respective portable communications device users (e.g. subjects 100, location employees (not shown) servicing such subjects, the respective table/section/seat/room where the respective subject 100 is being serviced, etc.) using registration information received via a network. In various embodiments, centralized communications and display node 250 may include one or more registration data modules (not shown). In various embodiments, a registration data module (not shown) receives, retrieves, and stores in memory (or in a device registration data repository 267), registration information binding respective portable communications device (e.g. QR code, RFID, unique identification strings, bar code, pseudorandomly generated value, or other suitable unique identifying information) to, for example, respective subjects (e.g. 100) (e.g. subject name, biometric data, pseudorandomly generated value, or other suitable unique identifying information), respective location employees (e.g. employee name, biometric data, pseudorandomly generated value, or other suitable unique identifying information), respective intra-location areas (e.g. table number, section number, seat number, room number, pump number, pseudorandomly generated value, or other suitable unique identifying information), etc.

In various embodiments, centralized communications and display node 250 includes device registration data repository 267. In some embodiments, device registration data repository 267 is a remote repository and centralized communications and display node 250 sends and received registration data from device registration data repository 267 via communications interface 225. In various embodiments, a pseudorandomly generated value is generated using, for example, a C RAND or RAND_S function, a PHP hypertext preprocessor function microtime or mt_rand, an Unix function /dev/random, a Java function SecureRandom, an Open SSL RAND_screen( ) function, or other suitable function, to return a pseudorandom sequence with a period long enough so that a finite sequence of reasonable length is not periodic and with an information entropy that is high enough to resist a brute force attack by a cryptanalyst. In various embodiments, a pseudorandomly generated value is generated using, for example, a secret key, or seed, to set the initial state of the pseudorandom sequence generator, a combination of the seed and, for example, a counter output, to provide an input to a hash function such as, for example, MD5 or SHA-1, to increase cryptographic security in the generated pseudorandom sequence.

In various embodiments, centralized communications and display node 250 includes a clock (not shown) which may provide an input to processor 208 such as, for example, an input of a time when transmitted data is received at communications interface 225 from a respective portable communications device (e.g. 110*a*, 110*b*, 110*c*). In various embodiments, non-transitory machine-readable storage medium 265 is encoded with program code executable by the processor 208 of the centralized communications and display node 250 for determining a respective location of each of portable communications devices (e.g. 110*a*, 110*b*, 110*c*) using at least a portion of the received data at the communications interface 225. In various embodiments, centralized communications and display node 250 includes a location module (not shown) which may provide an input to processor 208 such as, for example, an input of a location of each of portable communications devices (e.g. 110*a*, 110*b*, 110*c*) using at least a portion of the received data at the communications interface 225. In various embodiments, location data of each of portable communications devices (e.g. 110*a*, 110*b*, 110*c*) is stored in location data repository 266. In various embodiments, centralized communications and display node 250 includes location data repository 266. In some embodiments, location data repository 266 is a remote repository and centralized communications and display node 250 sends and received location data from location data repository 266 via communications interface 225. In various embodiments, a location module (not shown) may include timing functionality to determine a location of one or more portable communications devices (e.g. 110*a*, 110*b*, 110*c*) based on well-known time of arrival (TOA) and time difference of arrival (TDOA) techniques. In various embodiments, a location module (not shown) may also include discrete antenna elements in order to determine the angle of arrival (AOA) of received transmissions from portable communications devices (e.g. 110*a*, 110*b*, 110*c*). In various embodiments, a location module (not shown) may include functionality to determine a location of one or more portable communications devices (e.g. 110a, 110b, 110c) based on well-known wireless triangulation techniques. In various embodiments, a location module (not shown) may include functionality to determine a location of one or more portable communications devices (e.g. 110a, 110b, 110c) using the respective experience data received at communications interface 225 from the respective portable communications device and the respective binding between the device and a respective intra-location area (e.g., table, section, seat, pump, room, etc.).

In various embodiments, non-transitory machine-readable storage medium 265 is encoded with program code executable by the processor 208 of the centralized communications and display node 250 for determining a connection status of the communications interface 225. In various embodiments, non-transitory machine-readable storage medium 265 is encoded with program code executable by the processor 208 of the centralized communications and display node 250 for determining a connection status over the network between the communications interface 225 and the transmitter 120 of each portable communications devices (e.g. 110a, 110b, 110c). In various embodiments, non-transitory, machine-readable storage medium 265 is encoded with program code executable by the processor 208 for determining an encryption status of the network connection between the communications interface 225 and the transmitter 120 of each portable communications devices (e.g. 110a, 110b, 110c). In various embodiments, if the connection status determined by processor 208 is that a network connection is down, or that the status of encryption of such network connection is down, the program code executable by the processor 208 may generate an alert at the centralized communications and display node 250 as described above.

In various embodiments, centralized communication and display node 250 includes a forensics module (not shown). In various embodiments, a forensics module (not shown) may store received data in a non-transitory, tangible machine readable storage medium such as, for example, subject experience data repository 268. The non-transitory, tangible storage medium may be a non-transitory computer readable storage medium. In various embodiments, a forensics module (not shown) stores subject (e.g. 100) identifying data (e.g. biometric data, subject name) and past subject-specific experience data (e.g. prior machine-readable values indicative of one of a plurality of experience types for a respective subject, date and time information relating to activation of an actuator of a portable communication device (e.g. 110) by the subject, etc.). In various embodiments, the forensics module stores employee identifying data (e.g. biometric data, employee name), and past experience data for subjects serviced by such employee (e.g. prior machine-readable values indicative of one of a plurality of experience types for subjects serviced by such employee, date and time information relating to activation of an actuator of a portable communication device (e.g. 110) by such subjects, etc.). In various embodiments, the forensics module stores intra-location area identifying data (e.g. table, section, seat, pump, room), and past experience data for subjects serviced at such area (e.g. prior machine-readable values indicative of one of a plurality of experience types for subjects serviced at such area, date and time information relating to activation of an actuator of a portable communication device (e.g. 110) by such subjects, etc.).

In various embodiments, a centralized communication and display node 250 user can provide additional subject-specific experience information that is stored in a forensics module (not shown) such as, for example, actions taken by a manager and/or employee at the location to address the subject's experience in real-time, the date and time of such actions, and/or the result of such actions (e.g. subject satisfied). In various embodiments, an application operating on centralized communications and display node 250 can access stored subject-specific data via a forensics module (not shown) and/or via subject experience data repository 268 and to, for example, view and/or modify a subject-specific record displayed via display 285 for one or more subjects (e.g. 100), including, for example, to display past experience data for the subject (e.g. 100) along with, for example, an identifier for the current portable communication device (e.g. 110a, 110b, 110c) corresponding to the subject at the location, employee identifying information for the employee currently servicing the subject, intra-location identifying information for the area in which the subject is currently being serviced, etc. In various embodiments, an application operating on centralized communications and display node 250 can access stored employee-specific data via a forensics module (not shown) and/or via subject experience data repository 268 and to, for example, view and/or modify an employee-specific record displayed via display 285 for one or more employees, including, for example, to display past experience data for each of the subjects (e.g. 100) previously serviced by the employee along with, for example, respective identifiers for each of the current portable communication devices (e.g. 110a, 110b, 110c) corresponding to the employee at the location, respective subject identifying information for each of the subjects that the employee is currently servicing, intra-location identifying information for the area in which the employee is currently servicing subjects, etc. The inventor has observed that the forensics module (and/or subject experience data repository 268), centralized communication and display node 250, and applications running on such node, provide managers and owners of locations with attribution data, for example, for their employees (based on the experiences communicated by the respective subjects serviced by a respective employee, bindings between devices and such employees, correlated times of the communicated experiences and shift schedules for such employees, etc.), and/or for intra-location areas (based on the experiences reported by the respective subjects serviced by a respective employee, bindings between devices and such areas, etc.).

Figure 3:
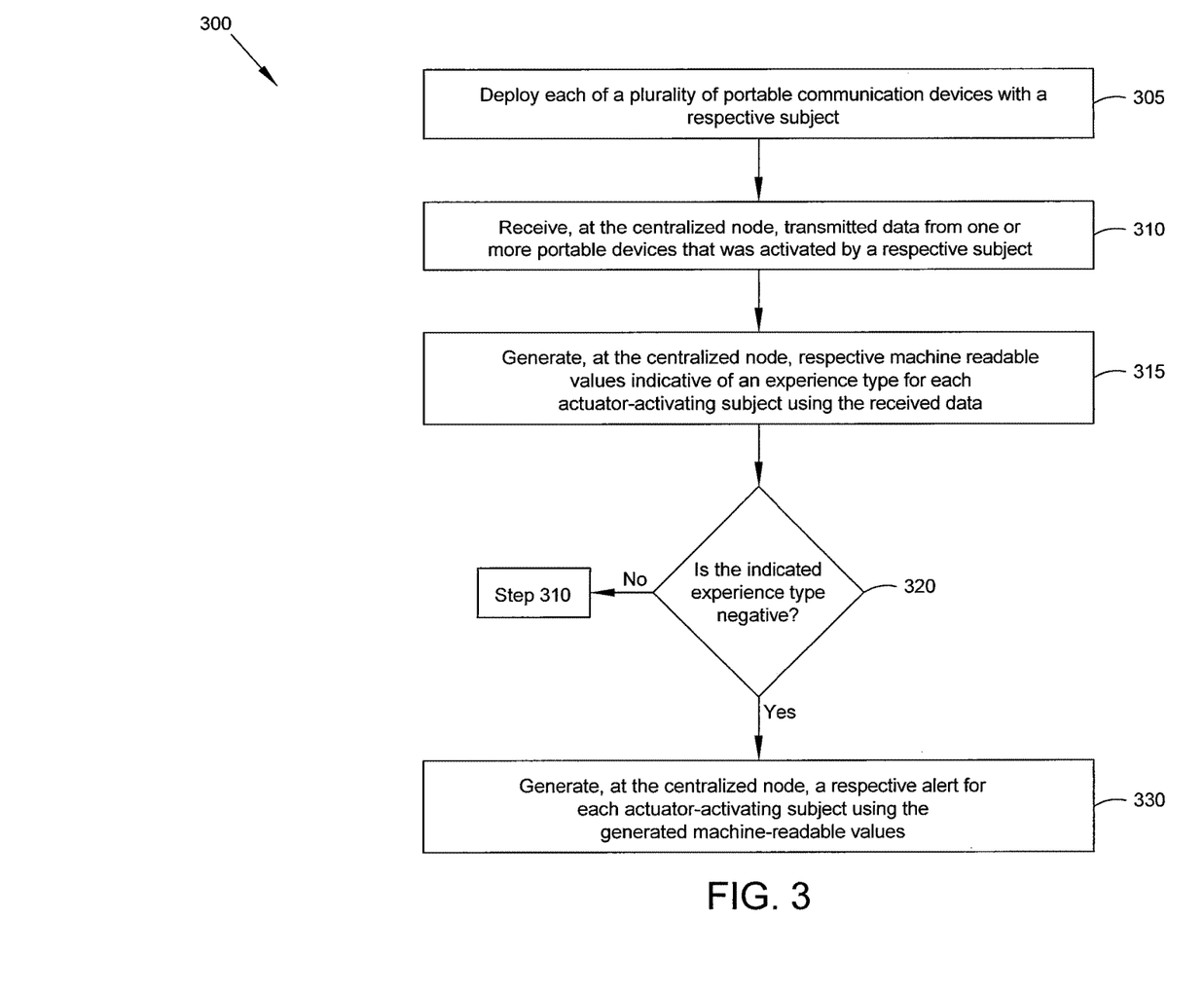
FIG. 3 is a flow chart of an example of a computer-implemented method of real-time monitoring and responding to user experiences at a location according to some embodiments of the present disclosure.

Referring now to FIG. 3, a flow chart 300 of an example of a computer-implemented method of real-time monitoring and responding to user experiences at a location according to some embodiments of the present disclosure is provided. At block 305, each of a plurality of portable communication devices (e.g. 110a, 110b, 110c) are deployed with a respective subject (e.g. patient, customer, etc.) and within the location. In various embodiments, each portable communication device is handed out to the respective subject (e.g. 100) at the beginning of the subject's interaction at the location (e.g. by the hostess, gas station employee, greeter at the store, check-in to the hotel, check-in to the hospital, by the respective employee servicing the respective subject at their assigned table/section/seat/room). In various embodiments, various portable communication devices are deployed prior to subject arrival at the location (e.g. deployed and disposed at the tables, seats, desks, pumps, rooms, at the location etc.). In various embodiments, a centralized communications and display node is deployed within the location.

At block 310, a centralized communications and display node (e.g. 250) receives transmitted data over a network (e.g. data from one or more transmitters 120 is transmitted over a network and received via communications interface 225) and from one or more of the plurality of portable communication devices (e.g. one or more of 110a, 110b, 110c). In various embodiments, the transmitted data includes a respective identifier of one of a respective plurality of actuators (e.g. 115a, 115b) disposed on the surface of each of the one or more portable communication devices and that was activated by the respective subject (e.g. 100). In various embodiments, the transmitted data from one or more of the plurality of portable communication devices includes a respective indicator of the activation time of the respective one actuator of each of the one or more portable communication devices. In some embodiments, the transmitted data from one or more of the plurality of portable communication devices includes a respective identifier of each of the one or more portable communication devices.

At block 315, the centralized communications and display node (e.g. 250) generates respective machine-readable values indicative of a respective experience type of a plurality of experience types for each of the actuator-activating subjects using the received data. In various embodiments, each experience type for each of the actuator-activating subjects is either a positive experience type or a negative experience type. At block 320, the centralized communications and display node (e.g. 250) determines whether the respective indicated experience type for each of the actuator-activating subjects is a negative experience type. For example, processor 208 may compare stored threshold experience types to, for example, a respective received identifier of a respective actuator (e.g. 115a, 115b) on each of the one or more portable communication devices (e.g. 110a, 110b, 110c) corresponding to the respective actuator-activating subject (e.g. 100). At block 320, if the respective indicated experience type for a respective actuator-activating subject is not a negative experience type, the computer-implemented method may return to block 310. At block 330, if the respective indicated experience type for a respective actuator-activating subject is a negative experience type, the centralized communications and display node (e.g. 250) generates a respective alert using the generated machine-readable values as described above. For example, the centralized communications and display node (e.g. 250) may change its display or transmit a notification message to a computing device (e.g. of an owner, manager, employee, etc.) at the location. In some embodiments, if the respective indicated experience type for a respective actuator-activating subject is a positive experience type, the centralized communications and display node (e.g. 250) generates a respective alert (e.g. a different, or lower priority, alert than the node generates for a negative experience type indication) using the generated machine-readable values as described above.

Thus, the present disclosure is directed to simple, inexpensive, portable communications devices that each inconspicuously provide experience information (e.g. customer and/or patient-specific experience information, employee-specific information, intra-location area specific information, etc.) in a rapid, simple, and subject-friendly manner to location owners, managers, and/or employees while the customers and/or patients are continuing to interact with the location of interest, at any given point in time throughout the duration of such interaction, and in a manner which is highly, and inexpensively, scalable and permits the location owners, managers, and/or employees to address any negative experiences of the customers and/or patients in real-time and prior to such customers and/or patients leaving the location of interest.

It may be emphasized that the above-described embodiments are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What I claim is:

1. A system for real-time user experience monitoring and response at a location, comprising:
    a plurality of portable communications devices configured for deployment within the location, each portable communications device comprising:
        a plurality of actuators disposed on a surface of the respective portable device, each actuator configured to, when activated by a subject at the location, generate an electronic signal indicating the activation of the respective actuator;
        a processor;
        a non-transitory machine-readable storage medium encoded with program code executable by the processor of the respective portable device for:
            determining a time relative to the activation of the respective actuator; and
            generating an alert on the respective portable device in response to receiving the generated electronic signal;
            determining a connection status over the network between the transmitter and the communications interface of the centralized communications and display node; and
            if the determined status is that the network connection is down:
                buffering, in memory at the respective portable device, the identifier of the respective activated actuator, the indicator of the determined time, and the identifier of the respective portable device as buffered data;
        a transmitter configured to transmit data over a network in response to receiving the generated electronic signal, the transmitted data comprising an identifier of the respective activated actuator, an indicator of the determined time, and an identifier of the respective portable device;
    a centralized communications and display node configured for deployment within the location comprising:
        a communications interface configured to be coupled to the network and to receive the respective transmitted data over the network from each of the transmitters of each of the portable devices;
        a processor coupled to the communications interface;
        a non-transitory machine-readable storage medium encoded with program code executable by the processor of the centralized communications and display node for:
            generating respective machine-readable values indicative of one of a plurality of experience types for each of the portable device subjects using the received data at the communications interface; and
            generating an alert for a respective portable device subject using the generated machine-readable values and if the indicated one experience type for the respective portable device subject is a negative experience type.

2. The system of claim 1, wherein the storage medium is further encoded with program code executable by the processor for generating a plurality of bindings between a respective one of the plurality of portable devices and respective employees at the location, wherein the system further comprises a forensics module configured to receive generated machine-readable values for each of a plurality of portable device subjects that were serviced by a respective employee at the location, to aggregate the received machine-readable values for the respective employee, and to store the aggregated machine-readable values for the respective employee.

3. The system of claim 1, wherein the alert generated by the processor of a respective portable communications device is programmable and comprises at least one of an audible notification, a visual notification, a haptic notification, and combinations thereof.

4. The system of claim 1, wherein the storage medium at the centralized communications and display node is further encoded with program code executable by the processor at the centralized communications and display node for determining a respective location of each of the portable devices using the received data at the communications interface.

5. The system of claim 1, wherein the time relative to the activation of the respective actuator comprises the time of receipt of the generated electronic signal at the processor of the respective portable device.

6. The system of claim 1, wherein the storage medium at the centralized communications and display node is further encoded with program code executable by the processor at the centralized communications and display node for:
- determining a connection status over the network between the communications interface and the transmitter of the respective portable device; and
- if the determined status is that the network connection is down:
  - generating an alert at the centralized communications and display node.

7. The system of claim 1, wherein the storage medium at the respective portable device is further encoded with program code executable by the processor at the respective portable device for, if the determined status is that the network connection is restored, sending the buffered data to the transmitter.

8. The system of claim 1, wherein each of the plurality of actuators is either a positive experience actuator or a negative experience actuator.

9. The system of claim 1, wherein the storage medium at the centralized communications and display node is further encoded with program code executable by the processor at the centralized communications and display node for changing a display at the centralized communications and display node based on the generated machine-readable values and if the indicated one experience type for the respective portable device subject is a negative experience type; and transmitting a notification message to a computing device at the location using the generated machine-readable values and if the indicated one experience type for the respective portable device subject is a negative experience type.

10. The system of claim 9, wherein the notification message is an electronic mail message or a text message.

11. The system of claim 1, wherein the storage medium at the centralized communications and display node is further encoded with program code executable by the processor at the centralized communications and display node for determining whether the indicated one experience type for the respective portable device subject is a negative experience type using the respective generated machine-readable values and one or more stored threshold values.

* * * * *